Patented July 12, 1949

2,475,709

UNITED STATES PATENT OFFICE 2,475,709

TREATMENT OF MELAM, MELEM, AND MELON

Johnstone S. Mackay, Greenwich, and Joseph H. Paden, Stamford, Conn., assignors to American Cyanamid Company, New York, N. Y., a corporation of Maine No Drawing. Application April 13, 1945, Serial No. 588,248

6 Claims. (Cl. 260—249.5)

This invention relates to a process of preparing melamine from melam, melem and melon.

In certain chemical processes involving the high temperature treatment of cyanamide, dicyandiamide, ammonium thiocyanate, thiourea, and other related substances, for example, when preparing melamine by fusing dicyandiamide or ammonium thiocyanate, there is usually obtained a considerable proportion of an insoluble residue consisting principally of melam, melem and melon. These latter substances are practically worthless as such and interfere with the use of the product in many industrial applications. It is usually necessary to separate the melam, melem or melon from the desired product after which these separated substances are thrown away.

Although it has been proposed to reconvert melam to melamine, as for example by hydrolysis to melamine and ammeline, the conversions obtained thus far have been very poor, making the conversion commercially unattractive. Insofar as we are aware, no one has been able to reconvert melem or melon to melamine under any conditions and these substances, when formed, represent a complete loss. We have discovered, however, that melam and also melem and melon may be converted into melamine in substantially quantitative yields by a relatively simple process which makes it possible for the first time to recover these insoluble by-products and convert them into a useful article of commerce.

It is known that melamine rapidly decomposes at temperatures above 350° C. at atmospheric pressure. In an experimental test at 400° C., 80% of the melamine decomposed during a thirty minute period to melam, melem and melon. Despite the known instability of melamine at high temperatures, we have discovered that we can convert melam, melem and melon to melamine by heating these substances at temperatures above 350° C. with anhydrous ammonia under a pressure of at least about 1000 pounds per square inch. Surprisingly, there is no decomposition of the melamine under these conditions.

Our discovery enables us to convert melam, melem and melon into melamine in a short period of time with excellent yields. It also makes it possible for us to convert melam, melem and melon to melamine when these substances are present as impurities in melamine produced by conventional processes.

In order to illustrate the invention in greater detail the following examples are given.

Example 1

A quantity of melam was prepared by heating dicyandiamide to 205° C. and thereafter removing melamine, unconverted dicyandiamide, and other water-soluble substances by leaching with hot water. The insoluble product was free from yellow colored material and was therefore presumed to contain no melon. It probably contained, however, a small proportion of melem.

42 g. of the melam, prepared as just described, and 25 g. of anhydrous ammonia were placed in an autoclave and heated at 300° C. for two hours. The pressure developed in the autoclave was found to be 2,340 pounds per square inch. When the autoclave was opened and the contents examined, it was found that approximately 96% of the melam was unchanged, being present as an insoluble residue. This experiment indicates that 300° C. is too low to effect any substantial conversion of melam to melamine in two hours' time.

Example 2

42 g. of melam and 25 g. of anhydrous ammonia were placed in an autoclave and heated at 350° C. for two hours at a pressure of 2,340 pounds per square inch. When the autoclave was opened and the contents examined, it was found that approximately 90% of the melam had been converted to melamine.

Example 3

42 g. of melam and 25 g. of anhydrous ammonia were placed in an autoclave and heated at 400° C. for two hours at a pressure of 3600 pounds per square inch. The conversion of the melam to melamine was found to be practically 100%, the insoluble residue remaining in the autoclave after extraction with hot water being negligible.

Example 4

42 g. of melam and 25 g. of anhydrous ammonia were placed in an autoclave and heated at 450° C. for two hours under a pressure of 2,890 pounds per square inch. The conversion of melam to melamine in this experiment was found to be approximately 98.3%.

Example 5

42 g. of melam and 25 g. of anhydrous ammonia were placed in an autoclave and heated at 500° C. for fifteen minutes at a pressure of 2900 pounds per square inch. Upon opening the autoclave it was found that the melam was completely converted to melamine.

Example 6

42 g. of melam and 15 g. of anhydrous ammonia were heated in an autoclave at 400° C. for two hours under pressure of 1510 pounds per square inch. The melam was converted into melamine to the extent of about 92%.

At 600 pounds per square inch the conversion was about 35%.

Example 7

Melon was prepared by heating 200 g. of melam to 650° C. and holding the material at this temperature for one hour. 112 g. of a yellow product was obtained which, upon chemical analysis, was found to be principally melon. This product was used in the following experiments.

42 g. of melon and 25 g. of anhydrous ammonia were heated in an autoclave to 350° C. for two hours at a pressure of 1750 pounds per square inch. On examining the contents of the autoclave it was found that 73.8% of the melon was converted to melamine.

Example 8

42 g. of melon and 25 g. of anhydrous ammonia were heated in an autoclave at 400° C. for two hours under a pressure of 1950 pounds per square inch. In this run 94.5% of the melon was converted to melamine.

Example 9

The preceding example was repeated at a temperature of 450° C. In this experiment 99.4% of the melon was converted to melamine.

Example 10

42 g. of melon and 25 g. of anhydrous ammonia were heated at 400° C. for fifteen minutes under pressure of 1950 pounds per square inch. On opening the autoclave and examining the contents, it was found that 84.5% of the melon had been converted to melamine.

As will be seen from the foregoing experiments, melam, melem and melon may be converted to melamine by heating these substances in an atmosphere of ammonia at temperatures above 350° C. The temperature range that we may employ may vary from about 350° C. to 600° C., preferably between 400° C. and 500° C. At higher temperatures the conversion takes place more rapidly and, as shown, very good results are obtained in periods of time as low as fifteen minutes. In fact, it appears that an excellent conversion can be obtained within a minute or two in suitable apparatus in which it is possible to heat the materials under high pressures and at high temperatures for short periods of time. Although we may heat the melam, melem or melon for periods of time up to about five hours, there appears to be no advantage in heating longer than two hours, and, in fact, we prefer an even shorter heating period.

As will be apparent from the examples just given, incomplete conversions are obtained at lower pressures. We prefer, therefore, that the pressure under which the conversion is conducted should be at least 1000 pounds per square inch. There is no actual top limit on the pressure but a practical limit dictated by apparatus considerations appears to be about 5000 pounds per square inch. These pressures are supplied by the ammonia in the system and it is necessary to supply enough ammonia to the reaction to react with the melam, melon or melem and result in a pressure of at least 1000 pounds per square inch in the reaction vessel. Otherwise the amount of ammonia is not critical.

We claim:

1. A method of preparing melamine which comprises heating at least one of the substances of the group consisting of melam, melem and melon with anhydrous ammonia at temperatures within the range of 400° C. to 500° C. under a pressure of at least 1000 pounds per square inch for a period of time not in excess of about two hours.

2. A method of preparing melamine which comprises heating melam, with anhydrous ammonia at temperatures of at least 400° C. under a pressure of at least 1000 pounds per square inch for a period of time not in excess of two hours.

3. A method of preparing melamine which comprises heating melem with anhydrous ammonia at temperatures of at least 400° C. under a pressure of at least 1000 pounds per square inch for a period of time not in excess of two hours.

4. A method of preparing melamine which comprises heating melon with anhydrous ammonia at temperatures of at least 400° C. under a pressure of at least 1000 pounds per square inch for a period of time not in excess of two hours.

5. A method which comprises heating melamine containing at least one of the substances of the group consisting of melam, melem and melon with anhydrous ammonia at temperatures of at least 400° C. under a pressure of at least 1000 pounds per square inch whereby the said melam, melem and melon is converted to melamine for a period of time not in excess of about fifteen minutes.

6. A method of converting melam, melem and melon to melamine which comprises heating a mixture of said substances at temperatures of at least 400° C. under a pressure of anhydrous ammonia of at least 1000 pounds per square inch for a period of time not in excess of about two hours.

JOHNSTONE S. MACKAY.
JOSEPH H. PADEN.

REFERENCES CITED

The following references are of record in the file of this patent:

UNITED STATES PATENTS

| Number | Name | Date |
| --- | --- | --- |
| 2,288,964 | Widmer | July 7, 1942 |

FOREIGN PATENTS

| Number | Country | Date |
| --- | --- | --- |
| 502,148 | Great Britain | 1939 |
| 523,448 | Great Britain | July 15, 1940 |